United States Patent Office 2,951,545
Patented Sept. 6, 1960

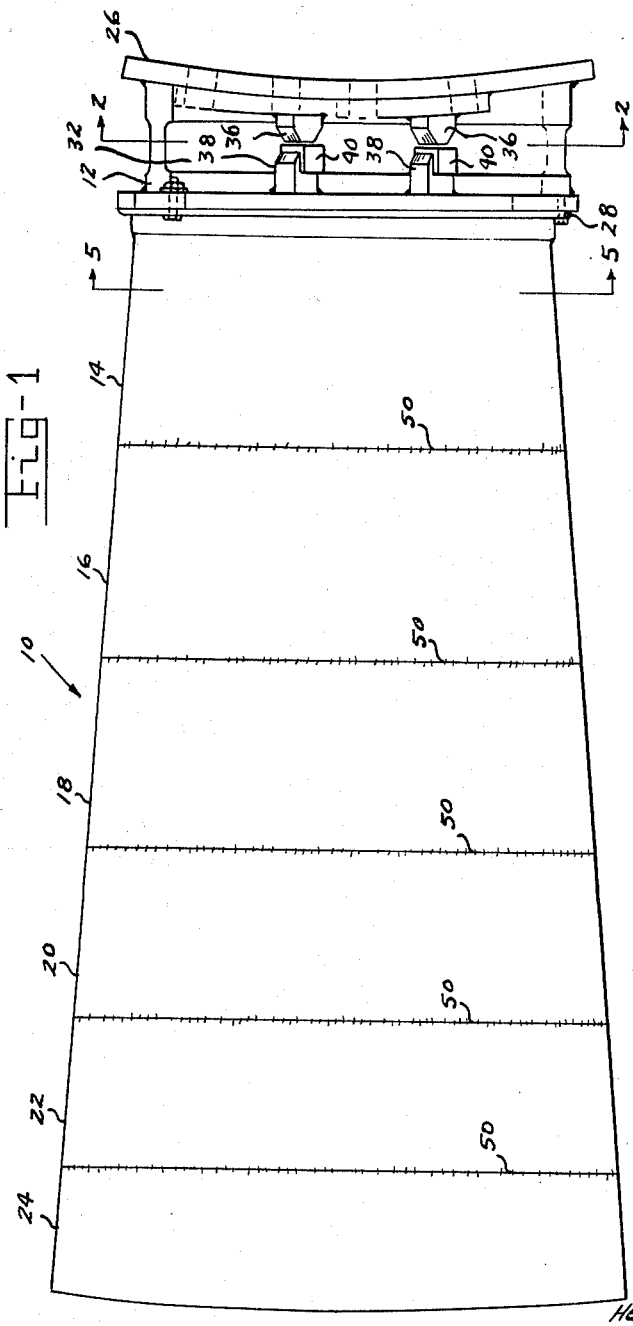

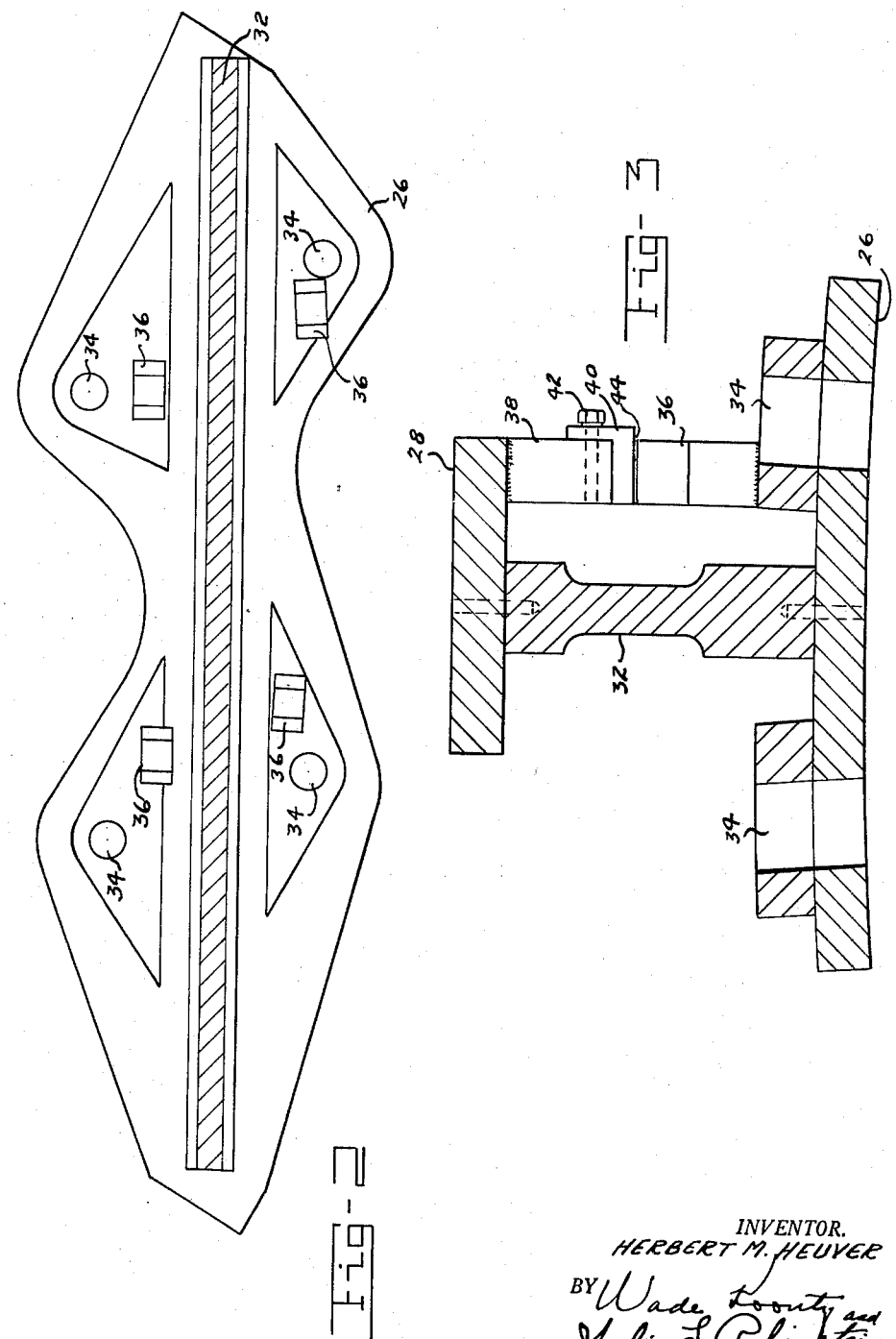

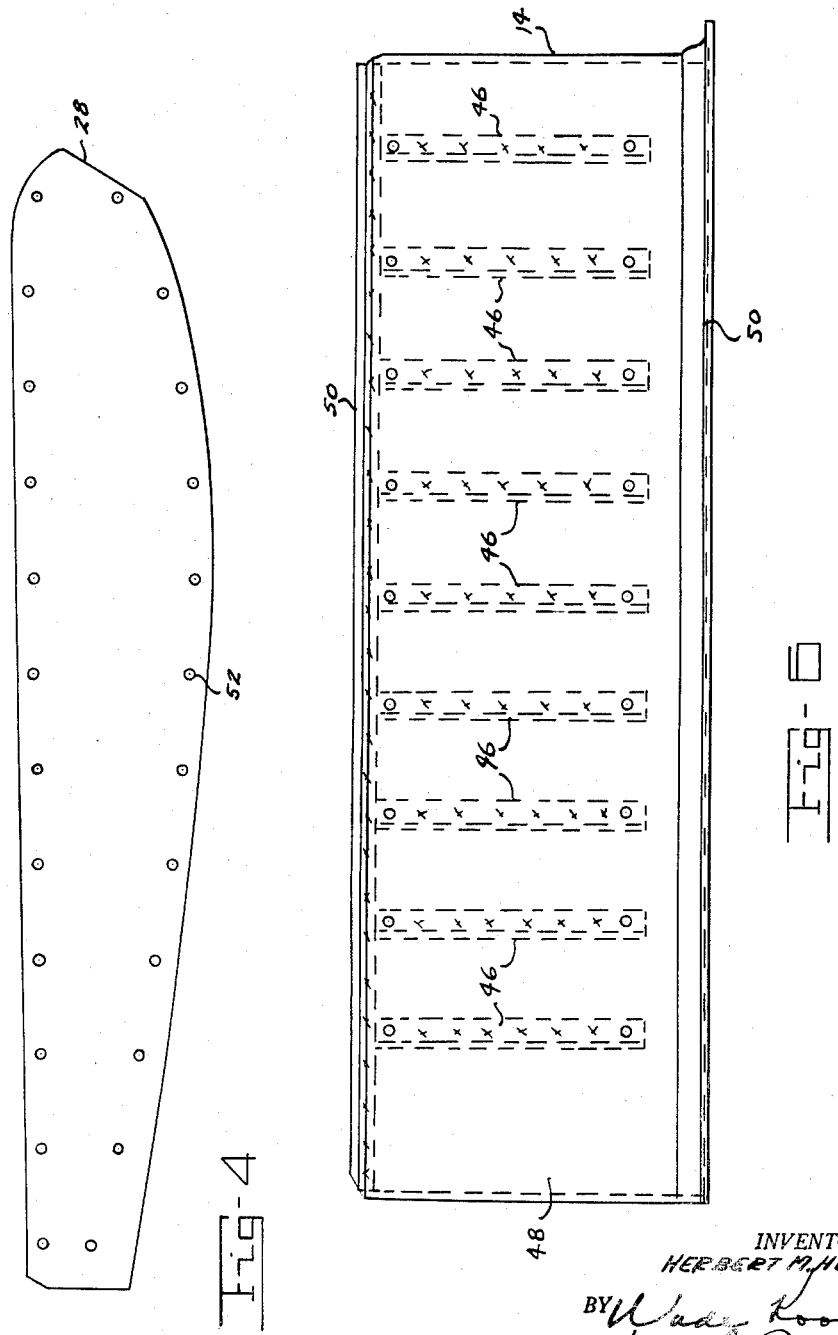

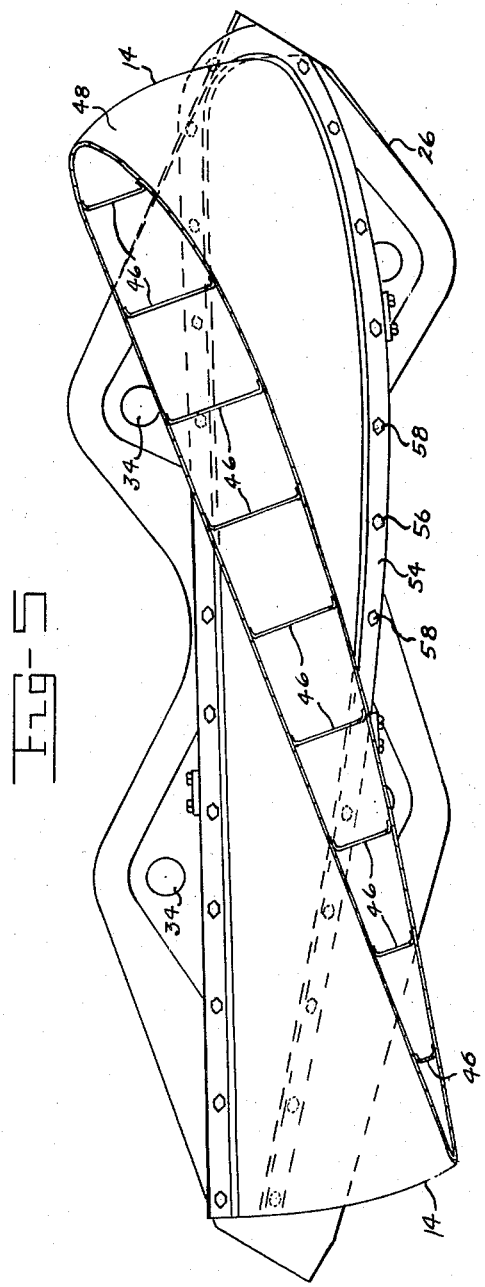

2,951,545

NON-RESONATING FAN BLADE

Herbert M. Heuver, Dayton, Ohio, assignor to the United States of America as represented by the Secretary of the Air Force Filed Aug. 21, 1956, Ser. No. 605,457

6 Claims. (Cl. 170—160.53)

(Granted under Title 35, U.S. Code (1952), sec. 266)

The invention described herein may be manufactured and used by or for the United States Government for governmental purposes without payment to me of any royalty thereon.

This invention relates to a blade construction and, more particularly, to wind tunnel fan blades.

Modern wind tunnel fan blades, blades of axial flow air compressors, turbine blades and the like, operate in a fluid medium and are usually adjacent stationary or contra-rotating fans or blades. These vanes or blades cause wakes to be formed in the fluid medium, which strike the blade at equally timed intervals as the blades rotate. These periodic blows cause the blades to vibrate at a frequency proportional to the speed of rotation. If the speed of rotation is such as to develop vibrations equal to or near the natural frequency of the fan blade, the fan blade will vibrate at an amplitude which may cause blade failure.

It is difficult to design a fan blade which is rigid and strong enough to withstand enormous fluid and dynamic forces, and which has a natural frequency high or low enough to be safely out of the operating speed range of the fan. This is because modern fan blades operate in speed ranges which require them to have the utmost rigidity and strength to withstand enormous centrifugal and fluid stresses; but the more rigid a blade is, the higher is its natural frequency and the natural frequency of a very rigid fan blade can be close to the vibration frequency developed by its speed of rotation. Furthermore, it is desirable that the fan blade must be light as well as strong and rigid. Hollow steel blades have been tried in an effort to satisfy these requirements, but they were not satisfactory because the blade skin had to be very thick in order to be able to hold its shape while subject to severe operational stresses. The thick skin caused the fan blade to be undesirably heavy. Furthermore, the large areas of unsupported blade skin tended to develop destructive resonant vibrations of its own.

To avoid these difficulties, fan blades have been formed by surrounding an internal supporting structure with a thin skin. The internal supporting structure comprised a plurality of spaced ribs connected by stringers or stiffeners. These stringers or stiffeners extended the length of the blade and were connected to the fan blade hub and carried a portion of the load. This was not satisfactory since design considerations show that it is most desirable, from the standpoint of strength and rigidity, that the load bearing material be as far as possible from the neutral axis of the blade, as in a monocoque construction. As a consequence, this arrangement produced either a weaker fan blade, or a fan blade that was heavier than desirable. If the supporting structure were not connected to the propeller hub but instead was used only to maintain the shape of the blade, another difficulty would take place. It is very difficult to secure long stiffeners to large skin areas in fan blades without imposing compressive forces on the stiffeners and consequently tension forces on the skin. Since the strength of these tension forces on the skin is not accurately known, it follows that the tension strength of the blade would be indeterminate since a fan blade made in this fashion is under tension even before it is in operation.

The principal object of this invention is to design a fan blade having a high rigidity and a low natural frequency.

A further object of this invention is to design a fan blade having a high rigidity and low natural frequency and which is provided with means for altering its natural frequency when the blade vibration exceeds any predetermined amplitude.

Still another object of this invention is to provide a fan blade that is simple to construct, light, rigid and so designed that the stresses and safety factors can be calculated to a high degree of accuracy.

A still further object of this invention is to design a blade provided with means for substantially eliminating resonant skin vibrations.

These and other objects of the invention will become more apparent when read in the light of the accompanying drawings, wherein:

Fig. 1 is a plan view of the fan blade constructed according to the principles of this invention.

Fig. 2 is a view of the base member of the fan blade taken on the line 2—2 of Fig. 1.

Fig. 3 is a sectional view of the end base member of the fan blade disclosing the flexural web and frequency changing abutments.

Fig. 4 is a view of the blade engaging end of the base member with the blade retaining bolts removed.

Fig. 5 is a view of the fan blade and base member taken on a line 5—5 of Fig. 1.

Fig. 6 is a plan view of a fan blade section disclosing the arrangement and position of the internal supporting structure.

Referring now to Fig. 1 of the drawings, a fan blade indicated generally at 10 comprises a flexural base member 12 and a plurality of blade sections 14, 16, 18, 20, 22 and 24. The base 12 comprises an arcuate fan hub engaging end portion 26 and a blade section engaging end portion 28. The end portions 26 and 28 are connected together by any conventional means to an intermediate flexible web portion 32, see Figs. 2 and 3. End portion 26 of base member 12 is adapted to be secured to the fan hub by bolts, not shown, which extend through the bolt holes 34 in base 12. The base portion 12 further includes a plurality of stops, for purposes to be described below. Each stop comprises a pair of projecting abutments. One abutment 36, see Fig. 3, extends from the hub engaging end portion 26 and the other abutment 38 depends from the fan blade section engaging end portion 28 of base 12. The ends of abutments 36 and 38 are closely adjacent each other. A spacer 40 is removably secured to abutment 38 by means of bolt 42. The spacers 40 come in various sizes and provide means for regulating the spacing 44 between the ends of abutments 36 and 38 in accordance with different operating conditions.

Each fan blade section comprises a plurality of internally mounted stiffeners or stringers 46 (see Fig. 6) which are secured by welding or any convenient means to the fan blade skin 48. Since the stiffeners and stringers in these sections are comparatively short, they can be conveniently welded to the blade skin without producing tension in it. As can be seen from Fig. 6, each stringer 46 is wholly within each blade section and is less in length than the section. The edges 50 of the skin 48 of each section is butt-welded to the edges of the skin of the adjacent sections, see Fig. 1, with this arrangement, the stiffeners or stringers in each section are in spaced non-contacting relationship to the stiffeners in each adjacent section. In this way the fan blade has a monocoque construction since the fan blade skin 48 substantially carries the entire load. Furthermore, the stresses on the skin 48 are determinate from a design view point because the strength of the butt welds can be accurately measured. Any indeterminancy in the strength in the sections would always be on the safe side as compared to the strength of the butt welds because the stiffeners in each hollow section would increase the strength of their section. If the butt welds were sufficiently strong, the blade would be strong enough.

Another advantage derived from the use of a plurality of short stringers or stiffeners 46 in forming an internal supporting structure for the fan blade is that it reduces the area of unsupported blade skin. Since unsupported skin has a natural frequency inversely proportional to its area, breaking up the unsupported blade skin into smaller sections increases the natural frequency of these sections to a point where it is substantially unaffected by the operation of the blade. This effectively eliminates problems caused by resonant skin vibrations.

The blade 10 is assembled as follows: The blade section engaging end portion 28 of base member 12 has a plurality of screw holes 52 disposed along its periphery, see Fig. 4. The base section 14 of fan blade 10 has a flange 54 at one edge and a plurality of screw holes 56 in spaced relationship along the flange, see Fig. 5. These holes 56 are in matching relation to the screw holes 52 in end portion 28 of base member 12. Screws 58 extend through holes 52 and 56 securing section 14 to the base 12. The next section 16 is butt-welded by its skin to section 14 along one edge and to section 18 at the other edge. The same is true for the succeeding sections. Since the sections of the blades nearest the base carry the heaviest load, to decrease the overall blade weight, the skin of each section thickens progressively toward the base of the blade.

A fan blade constructed in sections as hereinabove described would have a very high natural frequency and this natural frequency could be very close to the induced frequency caused by the rotation of the blade. When this very rigid monocoque blade is connected to the flexural base member 12, the natural frequency of the fan blade 10 is reduced to a value far below the frequency imposed by normal fan blade rotational speed. This effectively eliminates resonant blade vibration at the design operating conditions. To avoid occasional undesirable resonant vibrations caused by variations in the operating speed of the blade, stops on the blade structure are used. As seen in Fig. 3, if resonance causes the fan blade vibration to exceed a certain predetermined amplitude, the flexure in web 32 will permit abutments 36 and 38 to engage each other. When these abutments contact each other, the flexible web 32 becomes more rigid and the natural frequency of the fan blade is increased. This change in the natural frequency of the fan blade eliminates the resonant condition.

Obviously, many modifications of the present invention are permissible in the light of the above teachings. It is, therefore, to be understood that the invention may be practiced other than as described and still remain within the scope of the appended claims.

I claim:

1. An apparatus of the class described comprising in combination a rigid fan blade and base member, said base member including opposed end portions and an intermediate flexible web portion secured to said opposed end portions, said rigid fan blade secured to one end of said base member for reducing the natural frequency of the fan blade, the other end of said base member adapted to be secured to a fan blade hub, said base member further provided with means for limiting the amplitude of fan blade vibration in all directions.

2. The apparatus set forth in claim 1 wherein said fan blade vibration amplitude limiting means comprises at least one pair of spaced abutments, one abutment depending from the end of said base member connected to the rigid fan blade, the other abutment extending from the end of the base member adapted to be connected to said fan blade hub, the ends of said abutment members in closely spaced relationship to each other so that they engage each other and alter the natural frequency of the base and rigid fan blade when the vibration amplitude of the base and rigid fan blade exceeds a predetermined amount.

3. The apparatus set forth in claim 2 including means for changing the spacing between the ends of abutments to vary the permissible vibration amplitude of the rigid blade and base member before their natural frequency is altered.

4. An apparatus of the class described comprising in combination a rigid fan blade and a base member, said fan blade comprising a plurality of hollow sections, each of said hollow sections having a plurality of internal stiffeners and a surrounding skin, said internal stiffeners engaging said surrounding skin to hold it in its designed shape, the edges of the skin on each hollow section secured to the edges of the skin of each adjacent hollow section to form a rigid integral monocoque structure, said internal stiffeners mounted wholly within each hollow section and positioned in spaced noncontacting relationship to internal stiffeners in each adjacent hollow section, said base member including opposed end portions and an intermediate flexible web portion secured to said opposed end portions, said rigid fan blade secured to one end of the base member for reducing the natural frequency of the fan blade, the other end of said base member adapted to be secured to a fan blade hub, said base member further provided with means for limiting the amplitude of the fan blade vibration in all directions.

5. The apparatus set forth in claim 4 wherein said vibration amplitude limiting means in said base member comprises at least one pair of spaced abutments, one abutment depending from the end of said base member connected to said rigid fan blade, the other abutment extending from the end of the base member adapted to be connected to said rigid fan blade hub, the ends of said abutment members in closely spaced relation to each other so that they engage each other and alter the natural frequency of the fan blade when the vibration amplitude of the rigid fan blade exceeds a predetermined amount.

6. The apparatus set forth in claim 5 including means for changing the spacing between the ends of said abutments to vary the permissible vibration amplitude of the rigid fan blade and base member before their natural frequency is altered.

References Cited in the file of this patent

UNITED STATES PATENTS

| 1,442,169 | Molloy et al. | Jan. 16, 1923 |
| 1,789,240 | Leitner | Jan. 13, 1931 |
| 2,230,393 | Thomson | Feb. 4, 1941 |
| 2,458,975 | Brady | Jan. 11, 1949 |
| 2,585,468 | Isacco | Feb. 12, 1952 |

FOREIGN PATENTS

| 123,351 | Australia | Sept. 20, 1945 |
| 523,917 | France | May 2, 1921 |